Dec. 18, 1956 E. HARTMANN 2,774,292
EARTH CONDITIONING DEVICE
Filed April 28, 1954 2 Sheets-Sheet 1
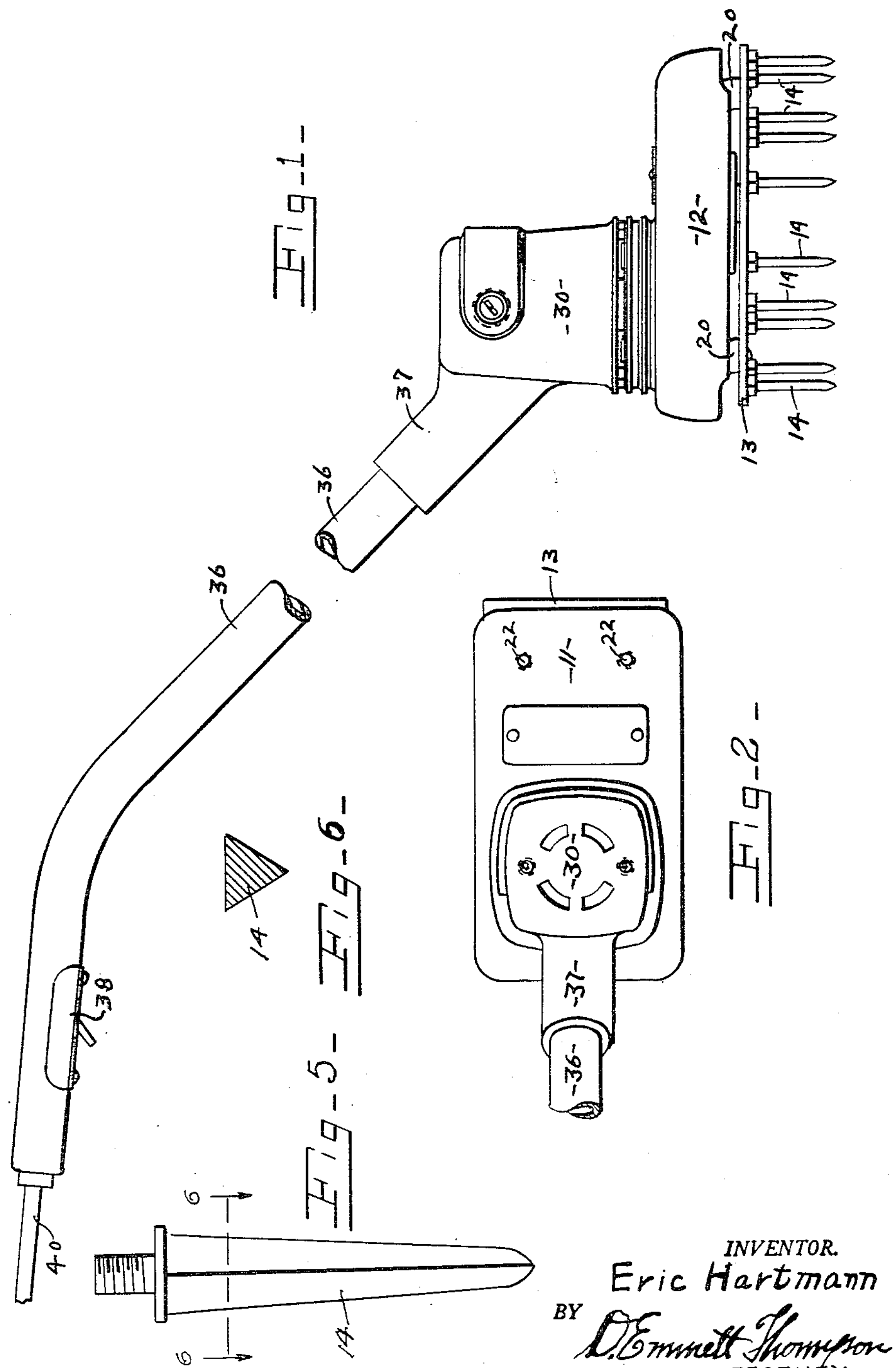
INVENTOR.
Eric Hartmann
BY D. Emmett Thompson
ATTORNEY.

Dec. 18, 1956
E. HARTMANN
2,774,292
EARTH CONDITIONING DEVICE
Filed April 28, 1954
2 Sheets-Sheet 2
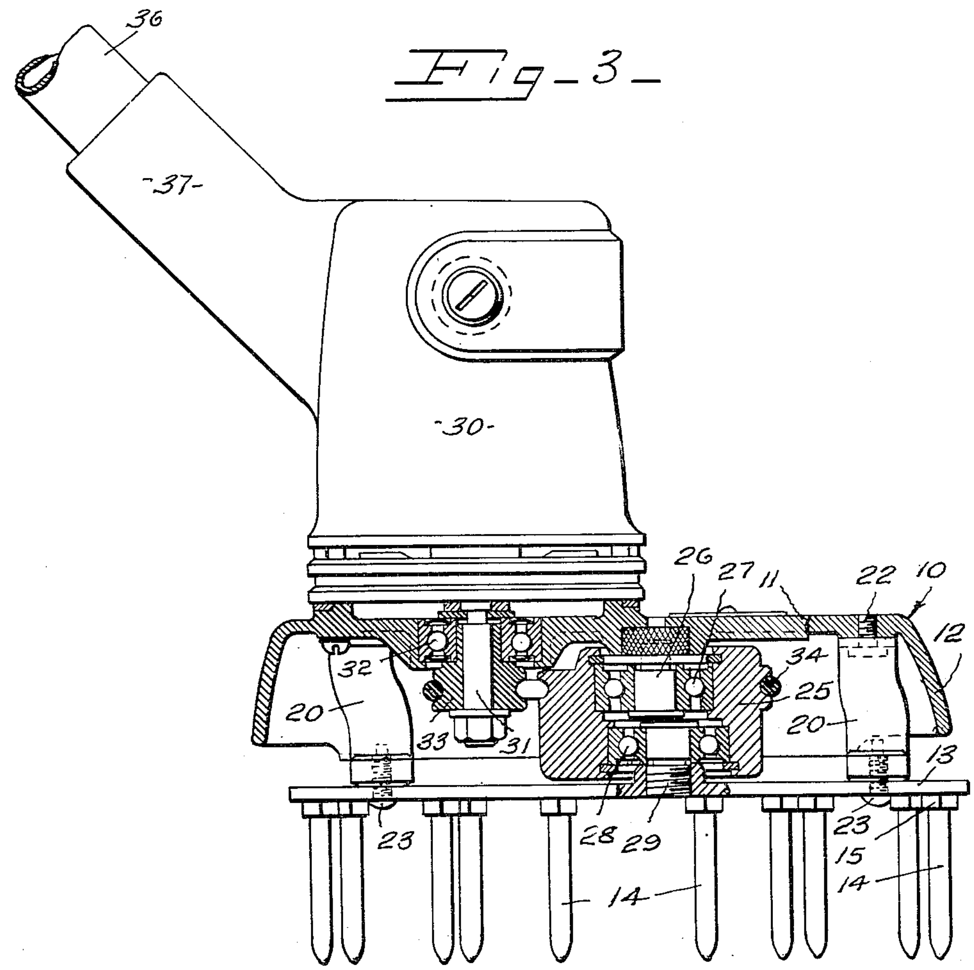
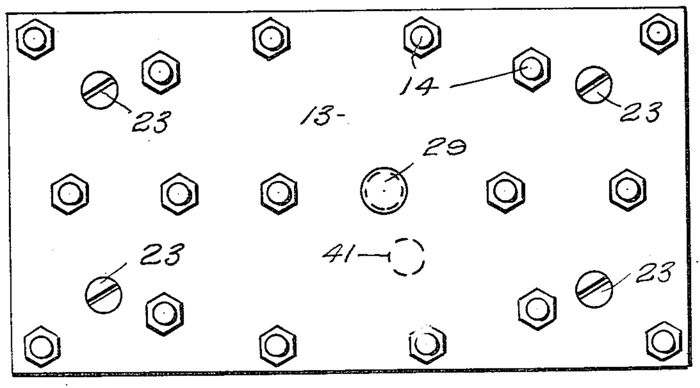
Fig. 4
INVENTOR.
ERIC HARTMANN.
BY D. Emmett Thompson
ATTORNEY.

United States Patent Office 2,774,292

Patented Dec. 18, 1956

2,774,292

EARTH CONDITIONING DEVICE

Eric Hartmann, Syracuse, N. Y., assignor to The Porter-Cable Machine Company, Syracuse, N. Y., a corporation of New York Application April 28, 1954, Serial No. 426,212

7 Claims. (Cl. 97—43)

This invention relates to an earth conditioning device and more particularly to a bodily manipulable power operated device for working or conditioning relatively small areas as in lawns, gardens, etc.

The invention has as an object an earth conditioning device having a plurality or group of spaced apart earth engaging members, and power operated means for effecting rapid orbital movement of the group of earth engaging members.

The invention has as a further object, an earth conditioning device wherein the arrangement above referred to is embodied in a particularly compact structure of light weight which can be conveniently manipulated by hand and which functions particularly efficiently in breaking up or pulverizing the soil to a depth of from one-half inch to two inches for the application of chemical soil conditions, peat-moss and fertilizers preparatory to the planting of seeds.

The invention consists in the novel features and in the combinations and constructions hereinafter set forth and claimed.

In describing this invention, reference is had to the accompanying drawings in which like characters designate corresponding parts in all the views.

Figure 1 is a side elevational view of an earth cultivator embodying my invention.

Figure 2 is a top plan view of the structure shown in Figure 1, with a portion of the manipulating handle broken away.

Figure 3 is a view, similar to Figure 1, but with the body of the device shown in vertical sectional view.

Figure 4 is a bottom plan view of the soil conditioning unit.

Figure 5 is a side elevational view of a modified structure of the earth engaging members.

Figure 6 is a sectional view taken on line 6—6, Figure 5.

The cultivator consists generally of a body member 10, here shown as of rectangular formation having a substantially flat top wall 11 and a depending flange 12. The earth conditioning unit consists of a frame, here shown in the form of a plate member 13 mounted on the body for movement relative thereto, and having a plurality or group of earth engaging members 14 depending therefrom. The earth engaging members 14 shown are in the form of prongs or pins extending normal to the frame member 13 and being fixedly secured thereto. The earth engaging members 14 may vary in structural detail—for example, they may be in the form of prongs or barbs formed integral with the plate 13 by being struck out of the plate and bent downwardly. Preferably, the members 14 are in the form of prongs triangular in cross section, as shown in Figures 5 and 6. In the structure shown, the pins 14 are detachably fixed to the plate by being threaded into the plate at their upper ends and locked by jam nuts 15. The prongs 14 are arranged in a non-linear group pattern with certain of the prongs being mounted at the perimeter of the frame plate 13 and others of the prongs being mounted in the mid section of the area of the plate which has both a lateral and longitudinal extent.

Power operated means is employed to effect movement of the plate 13 and this movement is confined to an orbital path by suitable means. In the form shown, the frame 13 is carried by a plurality of yieldable members in the form of rubber posts 20. There are four of these posts, each fixedly secured at its upper end to the top wall 11 of the body 10, as by screws 22, and the lower ends of the posts 20 are fixedly secured to the frame 13, as by screws 23. The motion transmitting means includes a crank member journalled in the body, which may be in the form of a circular block 25 journalled on a stud 26 fixedly mounted in the top wall 11 of the body. The block 25 is mounted on an antifriction bearing 27 carried by the stud 26, and the block is recessed for a bearing 28 carrying a crank pin 29 affixed to the plate 13. The bores in the block 25 for the bearings 27, 28, are slightly offset to provide a crank motion to the pin 29 upon rotation of the block. The block 25 is rotated by a motor mounted in a housing 30 having the lower end of its shaft 31 journalled in a bearing 32 and provided with a pulley 33. A driving belt 34 is trained over the pulley 33 and the block 25.

The rubber posts 20, in addition to serving as a mounting for the plate 13 also act to limit the movement imparted to the plate 13 by the crank pin 29 to an orbital path—that is, each one of the earth engaging prongs 14 move in a positively controlled orbital path.

The device is provided with an elongated handle bar 36 extending upwardly from a socket 37 formed on the motor housing 30. The handle is provided with a switch 38 for controlling the power to the motor through the cord 40.

In operation, the switch 38 is actuated to the on position, whereupon the orbital movement of the frame 13 is effected by the motor and the motion transmitting means including the crank 29. The device is then lowered to bring the prongs 14 into engagement with the earth, the prongs quickly sinking into the earth, and orbital movement of the group of prongs quickly loosens up the earth, whereupon the device may be moved laterally in any direction.

The orbit, in which the prongs 14 move, is relatively small, as indicated by the dotted circle 41 in Figure 4, and the frequency of the movement of the plate 13 is relatively high. In the device shown, the diameter of the orbit 41 is approximately 3/16 of an inch, and the crank block 25 is rotated at a speed of approximately 4000 R. P. M. With this arrangement, the soil is loosened, broken up and pulverized very quickly. The orbit in which the earth engaging members move and the speed imparted to the carrier plate 13 is dependent somewhat on the size of the machine.

The device is particularly efficient in conditioning small areas of soil. It is light and convenient to handle and in operation, it quickly breaks up or pulversizes the top soil into a fine granulated form. This serves to aerate the sub-soil and forms a mulch on the top which is so desirable in the modern theory of cultivation. The device is useful in reconditioning a bare spot, or a spot needing additional seeding in lawns. The action of the device does not tear out any grass already growing in the conditioned area and, in use around flower beds and plants, the device does not cause root injury to the plants. The device is particularly useful in mixing soil conditioners, peat-moss, and fertilizers, with the top soil. With the device, these soil additives are thoroughly and finely mixed with the soil. This is extremely difficult to do with hand tools. It will be apparent that the device provided with a short handle is particularly useful in conditioning beds and seed trays in greenhouses and, if constructed in larger size and mounted upon ground wheels, the device would be particularly useful in conditioning larger areas of soil.

What I claim is:

1. A manually supported and manipulable power operated earth conditioning device comprising a body including a motor housing, and an upwardly extending handle for manipulating the device, a motor mounted in said housing, a frame mounted on the under side of the body, frame supporting means carried by the body for suspending said frame for horizontal movement relative to the body, a plurality of vertically disposed earth engaging prong members fixedly mounted on said frame, said prong members depending from said frame in a non-linear group pattern distributed over an area of substantial lateral and longitudinal extent, some of said prongs being at the perimeter of said area and some of said prongs being in the mid-portion of said area, motion transmitting means journalled in the body and being operatively connected to said motor and said frame, said motion transmitting means effecting movement of the frame relative to the body in a positively controlled orbital path of predetermined magnitude in a horizontal plane perpendicular to said prongs.

2. A device of the character set forth in claim 1 wherein the magnitude of said orbital path is less than the spacing between said prongs.

3. A device as defined in claim 1 wherein said body is formed with a flange depending from the periphery thereof and encircling said motion transmitting means, the lower edge of said flange terminating above the peripheral edge of said frame.

4. A manually supported and manipulable power operated earth conditioning device comprising a body including a motor housing, and an upwardly extending handle for manipulating the device, a motor mounted in said housing, a frame, frame supporting means carried by the body for suspending said frame therefrom for movement in a horizontal plane, a plurality of vertically disposed earth engaging prongs fixedly mounted on said frame, said prongs depending from the frame in a non-linear group pattern distributed over an area of substantial lateral and longitudinal extent, some of said prongs being at the perimeter of said area and some of said prongs being in the mid-portion of said area, a crank member journalled in the body and being connected to said frame and being cooperable with said frame supporting means for imparting movement to the frame in said horizontal direction perpendicular to said prong members and in a positively controlled orbital path having a diameter less than the spacing between said prongs, and motion transmitting means operatively connecting said crank member to said motor.

5. A manually supported and manipulable power operated earth conditioning device comprising a body including a motor housing, and an upwardly extending handle for manipulating the device, a motor mounted in said housing, a frame, a plurality of vertically disposed flexible posts fixedly secured at their upper ends to said body and at their lower ends to said frame, said posts being effective to permit movement of the frame relative to the base in a horizontal plane, a crank member journalled in the body on a vertical axis, a plurality of vertically disposed earth engaging prong members depending from said frame, said prong members being arranged in a non-linear group pattern distributed over an area of substantial lateral and longitudinal extent, some of said prongs being at the perimeter of said area and some of said prongs being in the mid-portion of said area, said crank member being operatively connected to said frame to impart a positively controlled orbital movement to the frame in said horizontal plane, and motion transmitting means operatively connecting said crank member to said motor.

6. A manually supported and manipulable power operated earth conditioning device comprising a body including a motor housing, and an upwardly extending handle for manipulating the device, a motor mounted in said housing, a plurality of vertically disposed flexible posts fixedly secured to the body in spaced apart relation and depending therefrom, a frame fixedly secured to the lower ends of said posts, a plurality of earth engaging prong members depending from said frame in a non-linear group pattern distributed over an area of substantial lateral and longitudinal extent, some of said prongs being at the perimeter of said area and some of said prongs being in the mid-portion of said area, a crank member journalled in the body for rotation about a vertical axis, said crank member being operatively connected to said frame member and being cooperable with said posts to impart movement to the frame in a positively controlled orbital path of predetermined magnitude in a horizontal plane, motion transmitting mechanism operatively connecting said crank member to said motor, and said body being provided with a flange depending from the periphery thereof, with the lower edge of said flange terminating above the peripheral edge of said frame.

7. A device of the character set forth in claim 4 wherein said earth engaging members consist of prongs substantially triangular in cross section with the sides converging toward the lower ends of the prongs.

References Cited in the file of this patent

UNITED STATES PATENTS

| | | |
|---|---|---|
| 2,441,506 | Osman | May 11, 1948 |
| 2,517,733 | Takats | Aug. 8, 1950 |
| 2,613,582 | Harshberger | Oct. 14, 1952 |
| 2,625,867 | Hands | Jan. 20, 1953 |
| 2,639,564 | Atkin | May 26, 1953 |
| 2,651,246 | Peters | Sept. 8, 1953 |
| 2,697,897 | Dickinson | Dec. 28, 1954 |